United States Patent
Nandan et al.

(10) Patent No.: US 11,586,465 B2
(45) Date of Patent: Feb. 21, 2023

(54) SCALABLE HARDWARE THREAD SCHEDULER

(71) Applicant: TEXAS INSTRUMENTS INCORPORATED, Dallas, TX (US)

(72) Inventors: Niraj Nandan, Plano, TX (US); Mihir Mody, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/138,649

(22) Filed: Dec. 30, 2020

(65) Prior Publication Data

US 2021/0326174 A1  Oct. 21, 2021

Related U.S. Application Data

(60) Provisional application No. 63/011,143, filed on Apr. 16, 2020.

(51) Int. Cl.
| | | |
|---|---|---|
| *G06F 9/48* | (2006.01) | |
| *G06F 9/30* | (2018.01) | |
| *G06F 9/38* | (2018.01) | |
| *G06F 9/54* | (2006.01) | |

(52) U.S. Cl.
CPC ........ *G06F 9/4881* (2013.01); *G06F 9/30098* (2013.01); *G06F 9/3836* (2013.01); *G06F 9/544* (2013.01)

(58) Field of Classification Search
CPC .............................. G06F 9/4881; G06F 9/3836
See application file for complete search history.

(56) References Cited

U.S. PATENT DOCUMENTS

| | | |
|---|---|---|
| 7,873,817 B1 | 1/2011 | Aloni et al. |
| 10,489,206 B2 | 11/2019 | Sanghvi et al. |
| 2010/0250902 A1* | 9/2010 | Abernathy ............ G06F 9/3824 712/216 |
| 2016/0132329 A1 | 5/2016 | Gupte et al. |
| 2018/0189105 A1* | 7/2018 | Sanghvi ................ G06F 9/4812 |
| 2019/0095203 A1* | 3/2019 | Pediaditaki .......... G06F 9/3891 |
| 2019/0235927 A1 | 8/2019 | Nandan et al. |

OTHER PUBLICATIONS

International Search Report for PCT/2021/027443 dated Aug. 5, 2021.

* cited by examiner

*Primary Examiner* — Michael J Metzger
(74) *Attorney, Agent, or Firm* — Brian D. Graham; Frank D. Cimino

(57) ABSTRACT

A device includes a hardware data processing node configured to execute a respective task, and a hardware thread scheduler including a hardware task scheduler. The hardware task scheduler is coupled to the hardware data processing node and has a producer socket, a consumer socket, and a spare socket. The spare socket is configured to provide data control signals also provided by a first socket of the producer and consumer sockets responsive to a memory-mapped register being a first value. The spare socket is configured to provide data control signals also provided by a second socket of the producer and consumer sockets responsive to the memory-mapped register being a second value.

19 Claims, 5 Drawing Sheets

SCALABLE HARDWARE THREAD SCHEDULER

CROSS-REFERENCE TO RELATED APPLICATIONS

The present application claims priority to U.S. Provisional Patent Application No. 63/011,143, which was filed Apr. 16, 2020, is titled "Post-Silicon Scalable Hardware Thread Scheduler," and is hereby incorporated herein by reference in its entirety.

BACKGROUND

Various systems perform data processing using hardware accelerators, optionally in conjunction with software executing on programmable processors (e.g., digital signal processors and general purpose processors). A hardware accelerator is useful to perform certain operations more efficiently than software executing on such a processor. A hardware scheduler schedules the execution of a thread of tasks by the hardware accelerator. It is difficult or impossible to adapt the hardware scheduler and hardware accelerator for use cases not known or contemplated at the time of design due to the nature of the hardware scheduler being fixed in hardware.

SUMMARY

In an example of the description, a device includes a hardware data processing node configured to execute a respective task, and a hardware thread scheduler including a hardware task scheduler. The hardware task scheduler is coupled to the hardware data processing node and has a producer socket, a consumer socket, and a spare socket. The spare socket is configured to provide data control signals also provided by a first socket of the producer and consumer sockets responsive to a memory-mapped register being a first value. The spare socket is configured to provide data control signals also provided by a second socket of the producer and consumer sockets responsive to the memory-mapped register being a second value.

In another example of the description, a device includes a hardware data processing node configured to execute a respective task, and a hardware thread scheduler comprising a hardware task scheduler. The hardware task scheduler is coupled to the hardware data processing node and has a plurality of producer sockets. The device also includes a spare scheduler that has a consumer socket coupled to one of the plurality of producer sockets of the hardware task scheduler, and a plurality of producer sockets configured to provide data control signals from the consumer socket.

In yet another example of the description, a method includes configuring, by scheduling software executing on a processor, a hardware thread scheduler to perform a thread of tasks. The hardware thread scheduler includes a hardware task scheduler coupled to a hardware data processing node configured to execute a task of the thread. The method also includes configuring, by the scheduling software, a spare socket of the hardware task scheduler to provide data control signals also provided on one of a plurality of producer sockets or a plurality of consumer sockets of the hardware task scheduler.

BRIEF DESCRIPTION OF THE DRAWINGS

For a detailed description of various examples, reference will now be made to the accompanying drawings in which.

DETAILED DESCRIPTION

As described above, various systems perform data processing using hardware accelerators, optionally in conjunction with software executing on programmable processors (e.g., digital signal processors and general purpose processors). In one case, embedded safety systems, such as advanced driver assistance systems (ADAS), are used in automobiles to reduce human operation error. Such systems provide various functionality such as rear-view facing cameras, electronic stability control, and vision-based pedestrian detection systems. These systems perform computer vision processing of images captured by one or more cameras to detect objects in the field of view of the one or more cameras. The vision processing includes, for example, image processing, lens distortion correction, noise filtering, edge detection, motion detection, image scaling, and the like.

Examples of the present description generally relate to data processing systems, which may include line- and/or block-based data processing systems, including ADAS that perform vision processing. In particular, examples of the present description include block-based data processing systems having hardware task scheduler(s) with one or more configurable spare sockets. In some examples, systems also include spare scheduler(s) that are not directly coupled to a hardware processing node and that are configured to expand one consumer socket (e.g., coupled to one producer socket of another hardware task scheduler) to multiple producer sockets. Accordingly, data provided by the one producer socket of the other hardware task scheduler is provided, or made available, to multiple consumers by the multiple producer sockets of the spare scheduler. In some examples, the spare scheduler is also configured to duplicate data (e.g., from its one consumer socket to its multiple producer sockets). These examples are described in further detail below.

Figure 1:
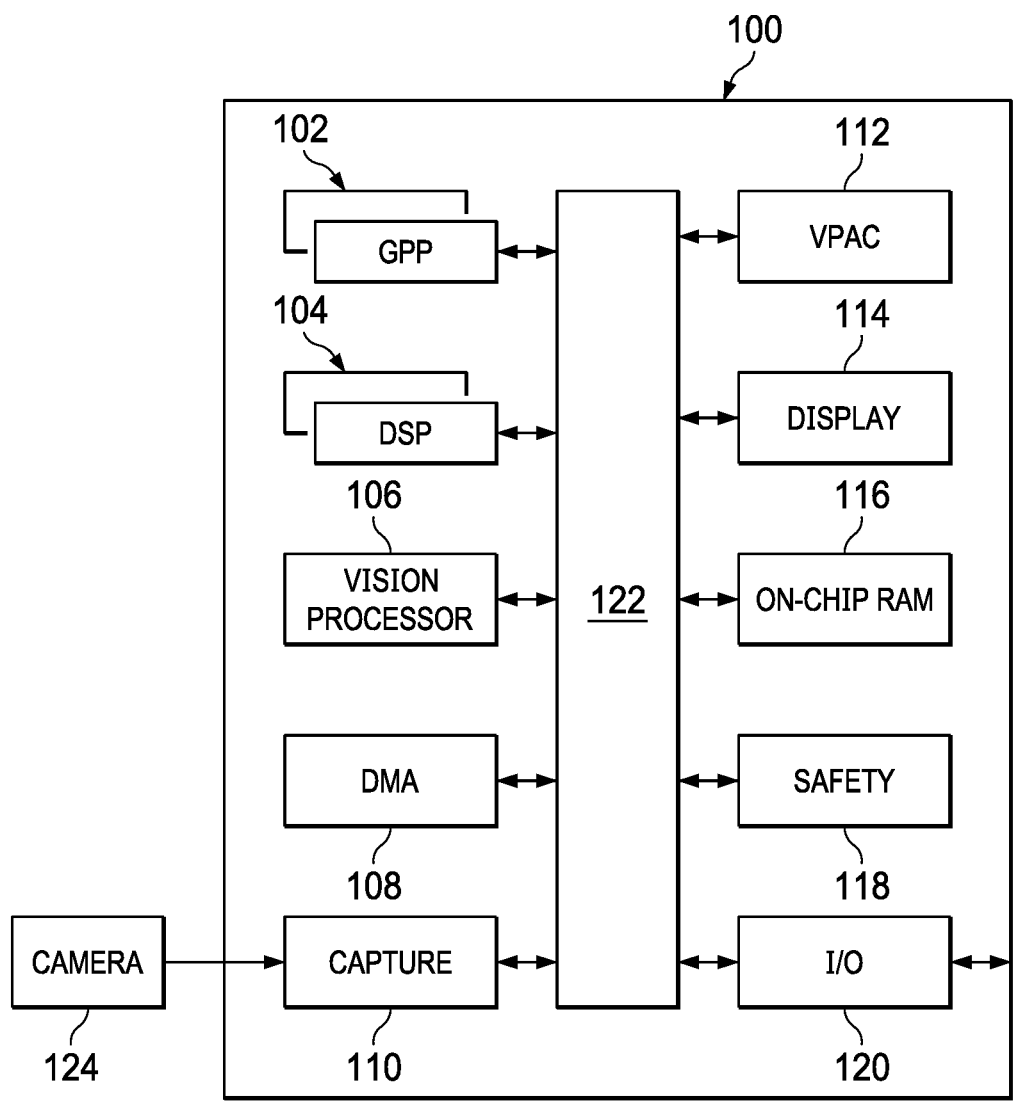
FIG. 1 is a block diagram of a multiprocessor system-on-a-chip (SOC) in accordance with examples of this description.

FIG. 1 is a block diagram of an example multiprocessor system-on-a-chip (SOC) 100 configured to perform block-based processing, such as computer vision processing in a camera-based ADAS. The SOC 100 includes general purpose processors (GPPs) 102, digital signal processors (DSPs) 104, a vision processor 106, and a vision preprocessing accelerator (VPAC) 112 coupled via a high speed interconnect 122. As explained further with reference to FIG. 2, the VPAC 112 includes hardware accelerators configured to perform various pre-processing operations on incoming camera images. In an example, the vision processor 106 is a vector processor configured for computer vision processing such as gradient computation, orientation binning, histogram normalization, and the like. In an example, the computer vision processing performed by the vision processor 106 uses the preprocessed output of the VPAC 112. The GPP 102 hosts the operating system and provides overall control of the operation of the SOC 100 including scheduling of the preprocessing tasks performed by the VPAC 112. In this example, the DSP 104 provides support for computer vision processing such as object detection and classification.

The SOC 100 further includes a direct memory access (DMA) component 108, a camera capture component 110 coupled to a camera 124, a display management component 114, on-chip random access (RAM) memory 116 (e.g., a non-transitory, computer-readable medium), and various input/output (I/O) peripherals 120 all coupled to the processors and the VPAC 112 via the interconnect 122. In addition, in some examples the SOC 100 includes a safety component 118 that includes safety related functionality to enable compliance with automotive safety requirements. Such functionality may include support for cyclic redundancy check (CRC) of data, clock comparator for drift detection, error signaling, windowed watch-dog timer, and self-testing of the SOC 100 for damage and failures.

Figure 2:
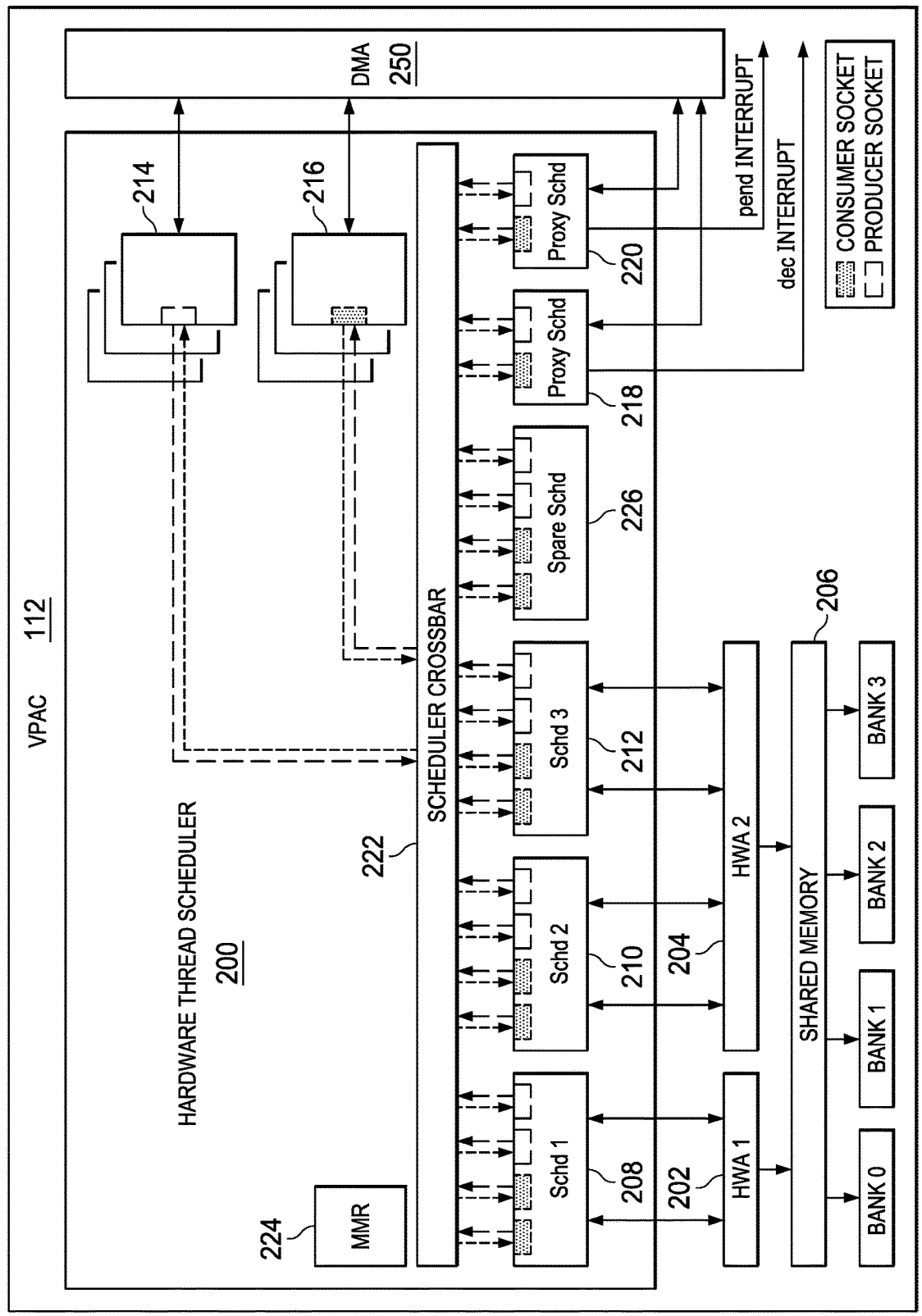
FIG. 2 is a block diagram of a vision preprocessing accelerator of the SOC of FIG. 1 in accordance with examples of this description.

FIG. 2 is a block diagram of an example VPAC 112. The VPAC 112 includes a hardware thread scheduler 200 coupled to example hardware accelerators 202, 204. The hardware accelerators 202, 204 are coupled to a shared memory 206. The two hardware accelerators 202, 204 are shown for simplicity of explanation and other examples include more or fewer accelerators. The hardware accelerators may be, for example, a lens distortion correction accelerator, an image scaling accelerator, a noise filter, and/or a vision specific image processing accelerator. Banks of storage area in the shared memory 206 may be designated as buffers for blocks of data being processed by the hardware accelerators 202, 204.

The hardware thread scheduler 200 is also coupled to two channels of the DMA 250. Two DMA channels are shown for simplicity of explanation and in other examples the hardware thread scheduler is coupled to more or fewer DMA channels. In an example, the DMA channels are configured to move blocks of data between the shared memory 206 and external memory, e.g., RAM 116.

The hardware thread scheduler 200 is configurable to schedule the execution of a single thread of tasks or multiple concurrent threads of tasks by hardware processing nodes ("nodes") of the VPAC 112. A thread, which is also referred to as a pipeline, is one or more tasks. A task is a particular function performed by a node and a node performs a single task. In various examples, a node is a hardware accelerator configured to perform a single task, a portion of a hardware accelerator configured to perform a task, a channel of the DMA 250, or software implementing a task on a processor external to the VPAC 112 (e.g., the DSP 104). Further, the hardware thread scheduler 200 includes hardware task schedulers, each of which manages the execution of a task on a node in a dedicated fashion.

Examples of the hardware accelerator configured to perform a single task (e.g., hardware accelerator 202) include a noise filtering accelerator and a lens distortion correction accelerator. An example of a hardware accelerator in which a portion of the hardware accelerator is configured to perform a task (e.g., hardware accelerator 204) is an image scaling accelerator configurable to perform image scaling on two or more images concurrently. That is, the image scaling accelerator may include multiple scalers that may be configured to perform multiple concurrent scaling tasks. One example of such an image scaler is described in U.S. patent application Ser. No. 15/143,491 filed Apr. 29, 2016.

In this example, the VPAC 112 includes five nodes: the single task hardware accelerator 202 (one node), the dual task hardware accelerator 204 (two nodes), and the two DMA channels. The hardware thread scheduler 200 includes a hardware task scheduler 208, 210, 212 for each hardware accelerator node in the VPAC 112, a DMA hardware task scheduler 214, 216 for each channel of the DMA 250 used by the VPAC 112, and two proxy hardware task schedulers 218, 220 for two external nodes (e.g., two software tasks implemented on an external processor). The task schedulers 208-220 are coupled to a scheduler crossbar 222, which is configured by various memory mapped registers in the memory mapped registers 224 to chain task schedulers to create threads. In an example, the scheduler crossbar 222 facilitates communication of control information between task schedulers assigned to a thread. In some examples, the scheduler crossbar 222 is a full crossbar in which any task scheduler can be chained with any other task scheduler. In other examples, the scheduler crossbar 222 is a partial crossbar with more limited chaining capability. In some examples, the hardware thread scheduler 200 also includes a spare scheduler 226 that is not directly coupled to a hardware processing node. The spare scheduler 226 is described in further detail below.

In general, the thread scheduling of the hardware thread scheduler 200 is a consumer/producer model. For example, a thread is a set of tasks having consumer/producer dependencies. A task/node managed by a task scheduler can be either a consumer task that consumes data from one or more producer tasks, a producer task that produces data for one or more consumer tasks, or both a consumer task and a producer task. A task scheduler includes one or more producer and/or consumer sockets depending on the type of task of the associated node.

For example, if a task scheduler is coupled to a node that performs a consumer task that consumes data from one producer task, then the task scheduler has at least a single consumer socket. If the consumer task consumes data from more than one producer task, then the task scheduler has at least one consumer socket for each producer task.

If a task scheduler is coupled to a node that performs a producer task that produces data for a single consumer task, then the task scheduler has at least a single producer socket. If the producer task produces data for more than one consumer task, then the task scheduler has at least one producer socket for each consumer task.

If a task scheduler is coupled to a node that performs a consumer/producer task, then the task scheduler has at least a consumer socket for each producer task producing data for the consumer/producer task and at least a producer socket for each consumer task consuming data from the consumer/producer task.

In the VPAC 112, the task schedulers 208, 210, 212 are depicted as having two consumer sockets and two producer sockets for simplicity. In other examples, the number of producer and consumer sockets in a task scheduler varies depending upon the consumption and production properties of the task/node coupled to the task scheduler as described above. Each node corresponding a channel of the DMA either executes a task that consumes data (e.g., is a consumer channel programmed to transfer data from shared memory 206 to external memory) or produces data (e.g., is a producer channel programmed to transfer data from external memory, such as with respect to the VPAC 112, to shared memory 206). The DMA task scheduler 216 is coupled to a consumer channel and includes a single consumer socket. The DMA task scheduler 214 is coupled to a producer channel and includes a single producer socket.

Each socket of the task schedulers 208-220 is coupled to the scheduler crossbar 222 by two signals, a pending signal indicating availability of consumable data, and a decrement signal indicating that a block of produced data has been consumed. A pending signal is referred to as a "pend" signal herein and a decrement signal is referred to as a "dec" signal herein. A task scheduler sends a pend signal via a producer socket to a consumer socket coupled to the producer socket when data is available and receives a dec signal via the producer socket from the coupled consumer socket when the produced data has been consumed. A task scheduler sends a dec signal via a consumer socket to a producer socket coupled to the consumer socket when the produced data has been consumed and receives a pend signal in the consumer socket from a coupled producer socket when data is available for consumption. In examples of this disclosure, a spare socket, such as a spare producer socket or a spare consumer socket, is configured to duplicate data control for a buffer containing data (e.g., in the shared memory 206). In one example, control for a buffer containing an example line of data is bifurcated between a producer socket and a spare producer socket configured for that buffer. Accordingly, the line of data in the buffer is not overwritten until the producer socket and the spare producer socket receive dec signals from the consumer sockets to which the producer socket and spare producer socket are coupled. In another example, control for a buffer containing an example line of data is bifurcated between a consumer socket and a spare consumer socket configured for that buffer. Accordingly, responsive to the line of data in the buffer being consumed (e.g., by an associated hardware accelerator), each of the consumer socket and the spare consumer socket sends a dec signal to the producer sockets to which the consumer socket and spare consumer socket are coupled.

The connection of pend and dec signals between producer and consumer sockets of task schedulers to form threads is controlled by the scheduler crossbar 222. In some examples, scheduling software executing on the GPP 102 configures a thread of tasks to be performed on the VPAC 112 by setting control signal values of multiplexers in the scheduler crossbar 222 to "connect" the pend and dec signals of the task schedulers for the desired tasks.

In some examples, the scheduler crossbar 222 includes a multiplexer for the incoming pend signal of each consumer socket and a multiplexer for the incoming dec signal of each producer socket. For example, if the task schedulers 208-220 include M consumer sockets and N producer sockets, then the scheduler crossbar 222 includes M+N multiplexers. A multiplexer coupled to the incoming dec signal of a producer socket includes a single output coupled to the incoming dec signal and M inputs, one for each outgoing dec signal of each consumer socket. A multiplexer coupled to the incoming pend signal of a consumer socket includes a single output coupled to the incoming pend signal and N inputs, one for each outgoing pend signal of each producer socket. Each of the multiplexers is coupled to a corresponding control register in the MMR 224 that can be programmed to select one of the multiplexer inputs as the output.

Each of the task schedulers 208-220 is coupled to a respective node via various signals. The signals may be, for example, a node initialization signal, an initialization complete acknowledgement signal, a task start signal, a task completion signal, and an end of processing signal. The end of processing signal is useful because a task may be executed multiple times to process incoming data (e.g., a task may be executed multiple times to process different subsets of a block of video data). The node/task is aware of when all the data has been processed and uses the end of processing signal to indicate that all the data has been processed and there is no need to execute the task again. Each time the task scheduler receives the task completion signal, the task scheduler will start the task again unless the end of processing signal is received.

The MMR 224 is configured to store various control and configuration parameters for the hardware thread scheduler 200. The parameters include parameters for configuring and controlling threads and parameters for configuring and controlling the task schedulers 208-220, the one or more spare scheduler(s) 226, and configurable spare socket(s) of the task schedulers 208-220. In some examples, the MMR 224 includes a thread control register for each of a maximum number of threads that can be executed concurrently on the VPAC 112. Each thread control register corresponds to a particular thread number, e.g., 0, 1, . . . n−1 where n is the maximum number of threads. A thread control register includes an enable/disable bit that may be used to activate or deactivate the corresponding thread. Further, the MMR 224 includes a task scheduler control register for each task scheduler 208-220. A task scheduler control register includes an enable/disable bit that may be used to activate or deactivate the corresponding task scheduler and a field identifying the thread number to which the task scheduler is assigned.

In some examples, the MMR 224 also includes a consumer control register for each consumer socket and a producer control register for each producer socket. A consumer control register includes an enable/disable bit that is used to activate or deactivate the corresponding consumer socket and the producer select value for the multiplexor coupled to the consumer socket. A consumer control register for a consumer socket in a proxy task scheduler also includes a "pend" bit that is set by the external task to indicate when data is available for consumption.

A producer control register includes an enable/disable bit that is used to activate or deactivate the corresponding producer socket and the consumer select value for the multiplexor coupled to the producer socket. A producer control register for a producer socket in a proxy task scheduler also includes a "dec" bit that is set by the external task to indicate that a block of data has been consumed.

The MMR 224 also includes a producer buffer control register and a producer count register for each producer socket. A producer buffer control register includes a buffer depth field specifying the maximum number of blocks of data a producer can have pending for consumption and a producer count register includes a count field that holds the count of how many blocks of data a producer currently has pending for consumption. The value of the buffer depth field depends on the amount of shared memory assigned for storing the produced data blocks and the size of the data blocks. The combination of the maximum buffer depth and the count may be used to prevent buffer overflow and underflow as production and consumption of data may be asynchronous.

In examples of this description, scheduling software executing on the GPP 102 configures a thread to be executed on the VPAC 112 by writing appropriate values in the registers of the task schedulers 208-220 to be included in the thread. In these examples, the scheduling software writes appropriate producer select values and consumer select values for the sockets of the task schedulers 208-220 of the tasks to be included in the thread to synchronize the tasks and enable the sockets. The scheduling software also appropriately sets the enable/disable bit in the task scheduler control register of each task scheduler in the thread to enable each task scheduler. In these examples, the scheduling software also selects a thread number for the thread and writes that thread number in the task scheduler register of each task scheduler in the thread. Once a thread is configured, the scheduling software is configured to initiate execution of the thread by appropriately setting the enable/disable bit in the corresponding thread control register to activate the thread.

In addition to the above, in examples of this description, the scheduling software configures MMR(s) 224 to cause a spare producer socket of a hardware task scheduler to provide additional data control (e.g., sends a pend signal and/or receives a dec signal) for a buffer (e.g., in addition to a producer socket configured for the buffer to enable duplicating or tapping data in the buffer) that is produced by an associated hardware accelerator. In other examples, the scheduling software configures MMR(s) 224 to cause a spare consumer socket of a hardware task scheduler to provide additional data control (e.g., sends a dec signal and/or receives a pend signal) for a buffer (e.g., in addition to a consumer socket configured for the buffer) that is consumed by an associated hardware scheduler. The configurable spare socket enables additional, programmable connectivity for the hardware task scheduler to handle various use cases not contemplated at the time of hardware design. In some examples, the scheduling software also configures the MMR(s) 224 to specify a coupling between a hardware task scheduler producer socket and a consumer socket of a spare scheduler. Unlike the hardware task scheduler, the spare scheduler is not directly coupled to a hardware processing node. Additional spare schedulers are similarly configurable in other examples. In these examples, an arbitrary data flow graph is configurable by the scheduling software to address use cases determined after the time of hardware design. Additionally, in terms of hardware design, it may be less costly to implement a chain of spare schedulers to expand (e.g., to additional consumer tasks) data produced at a producer socket of a hardware task scheduler when compared to implementing additional producer sockets in the hardware task scheduler itself. In other example, as an alternative to configuring MMR(s) 224 to cause spare producer or consumer sockets to provide additional data control, or to specify coupling(s) to a spare scheduler, such configurations may be achieved by the scheduling software or other programming (e.g., by firmware or hardware) to tie off one or more configuration register value(s) to achieve the desired configuration(s) of spare producer socket(s), spare consumer socket(s), and/or spare scheduler(s).

In the example of FIG. 2, the hardware task schedulers 208, 210, 212 are shown and described as having two consumer sockets and two producer sockets each. However, as described above, hardware task schedulers include differing numbers of consumer and/or producer sockets in other examples. Additionally, hardware task schedulers are often configured to handle various input/output scenarios, and/or possible combinations or permutations of consumer and/or producer sockets.

In one case, for the purposes of explanation, a hardware task scheduler is coupled to a vision imaging subsystem (VISS) hardware accelerator. This scheduler is referred to as a VISS scheduler and the accelerator is referred to as a VISS accelerator. The VISS accelerator is configured to consume or process data from up to three input sources (e.g., three exposures of raw image sensors) to generate and provide six output planes (e.g., Luma-Y 12-bit (Y12), Chroma-UV 12-bit (UV12), Luma-Y 8-bit (Y8), Chroma-UV 8-bit (UV8), Saturation-S 8-bit (S8), Statistics (H3A) outputs) responsive to the consumed data. Additionally, in this example, the VISS scheduler is configured to handle 32 scenarios, or permutations of data input and output combinations. Thus, the VISS scheduler as implemented in hardware actually requires 96 consumer sockets (e.g., 3 inputs*32 scenarios) and 192 producer sockets (e.g., 6 outputs*32 scenarios).

However, in the above case, the VISS scheduler is limited to consuming data produced by three producer nodes and producing data to six consumer nodes. As a result, the possible graphs able to be implemented by a thread scheduler are limited to those use cases known at the time of hardware design. Additionally, it is costly to "oversize" the number of consumer and/or producer sockets for a hardware task scheduler at the time of hardware design due to the fact that the number of sockets scales proportionally to the number of possible scenarios of multi-producers and multi-consumers, as described above.

To address the forgoing, examples of this description include a hardware task scheduler that is provided with an additional or spare producer socket that is configurable (e.g., by the MMR 224) to provide additional data control for a buffer, for which data control is also provided by another producer socket. Other examples of this description include a hardware task scheduler that is provided with an additional or spare consumer socket that is configurable (e.g., by the MMR 224) to provide additional data control for a buffer, for which data control is also provided by another consumer socket.

For example, the spare socket is a spare producer socket that, responsive to a MMR 224 having a first value, provides data control for a first buffer for which data control is also provided by a first producer socket of the hardware task scheduler. Continuing this example, the spare producer socket provides data control for a second buffer for which data control is also provided by a second producer socket of the hardware task scheduler responsive to the MMR 224 having a second value. Thus, the spare producer socket enables additional, programmable connectivity for the hardware task scheduler, such as to handle an after-developed use case graph, or a use case that was not contemplated at the time of hardware design. For example, the hardware task scheduler is configured to produce data from a buffer to an additional consumer task, which would not have been possible using the originally-designed set of producer sockets.

In some examples, the hardware task scheduler is provided with multiple spare producer sockets that are configurable by the MMR 224 as described above. For example, responsive to a first MMR 224 having a first value, the first spare producer socket is configured to provide data control for a buffer for which data controls is also provided by a first producer socket (e.g., Y12) of the hardware task scheduler. Responsive to the first MMR 224 having a second value, the first spare socket is configured to provide data control for a buffer for which data control is also provided by a second producer socket (e.g., UV12). A second spare producer socket functions similarly. For example, responsive to a second MMR 224 having a first value, the second spare producer socket is configured to provide data control for a buffer for which data control is also provided by the first producer socket (e.g., Y12) of the hardware task scheduler. Responsive to the second MMR 224 having a second value, the second spare producer socket is configured to provide data control for a buffer for which data control is also provided by a second producer socket (e.g., UV12).

In another example, the spare socket is a spare consumer socket that enables the hardware task scheduler to accept data from an additional producer task (or from a multi-producer task). Continuing the VISS example from above, a spare consumer socket enables the VISS scheduler to consume or process data from an additional, fourth input source (e.g., an additional DMA channel or additional producer task). The spare consumer socket also enables the VISS scheduler to consume or process data from a multi-producer task, such as one that produces two such input sources (e.g., exposures of raw image sensors). Thus, the spare consumer socket enables additional; programmable connectivity for the hardware task scheduler, such as to handle an after-developed use case graph, or a use case that was not contemplated at the time of hardware design.

For example, the hardware task scheduler is configured to consume data from an additional producer task, which would not have been possible using the originally-designed set of consumer sockets. Further, in some examples, the hardware task scheduler is provided with multiple spare consumer sockets. In these examples, the hardware accelerator (e.g., the VISS accelerator) may itself be software-programmable to take advantage of the additional input made available by the spare consumer socket. For example, the VISS accelerator is initially configured to process three exposures of raw image sensors, but is software-programmable to process an additional input, such as a fourth exposure (e.g., from an additional DMA channel). In these examples, the producer of such additional input for the spare consumer socket is specified by a spare consumer MMR 224. For example, responsive to the spare consumer MMR 224 having a first value, the spare consumer socket consumes data from a first producer. Responsive to the spare consumer MMR 224 having a second value, the spare consumer socket consumes data from a second producer.

Figure 3:
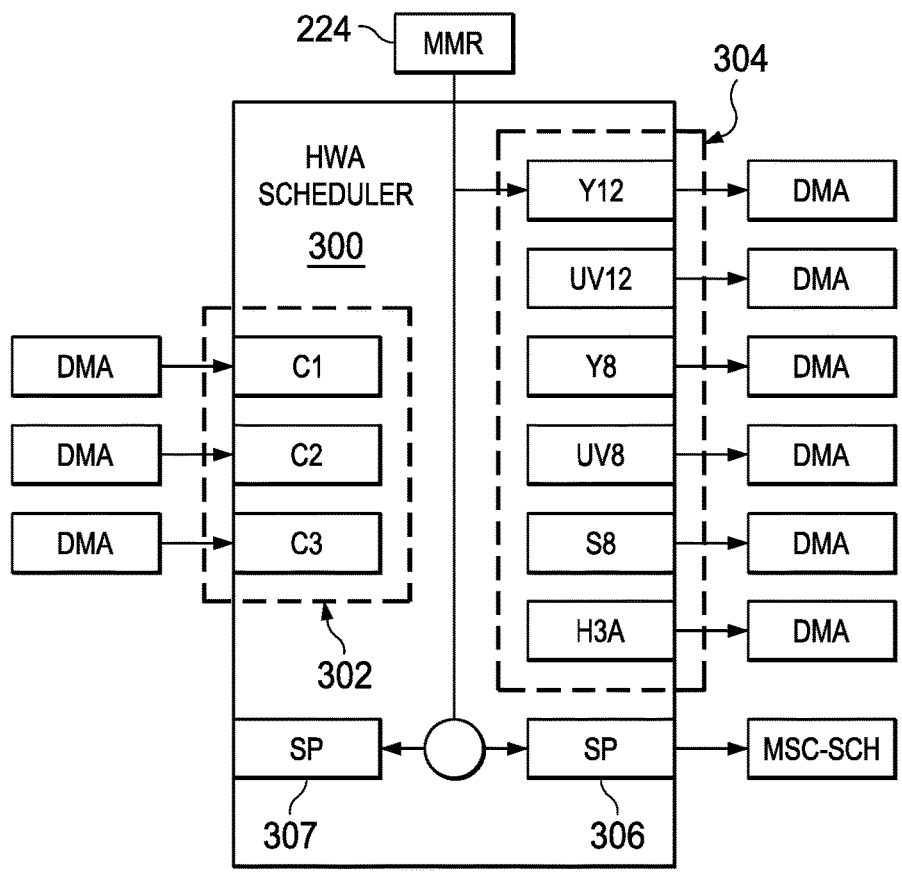
FIG. 3 is a block diagram of a hardware task scheduler having a spare socket in accordance with examples of this description.

FIG. 3 is a block diagram of a hardware task scheduler 300, such as the VISS scheduler described above, in accordance with examples of this description. As described above, the associated hardware accelerator (e.g., VISS accelerator) is configured to consume or process data from three input sources to generate and provide six outputs (e.g., Y12, UV12, Y8, UV8, S8, H3A outputs). In this example, the hardware task scheduler 300 is configured to couple to a node (e.g., the VISS accelerator) that performs a consumer/producer task, and thus the hardware task scheduler 300 includes consumer sockets 302 and producer sockets 304. For simplicity, the hardware task scheduler 300 is shown including three consumer sockets 302 and six producer sockets 304. As described above, the actual number of consumer sockets 302 and the producer sockets 304 is determined by multiplying the number of inputs by a number of possible scenarios that the hardware task scheduler 300 is configured to handle.

In accordance with examples of this description, the hardware task scheduler 300 also includes a configurable spare producer socket 306 and/or a configurable spare consumer socket 307. A MMR 224 specifies the one of the data buffers for which the spare producer socket 306 and/or the spare consumer socket 307 provides data control. For example, the MMR 224 having a first value causes the spare producer socket 306 to provide data control (e.g., sends pend signals and/or receives dec signals) for the Y12 buffer/output, while the MMR 224 having a second value causes the spare producer socket 306 to provide data control for the UV12 buffer/output, and so forth. Similarly, the spare consumer socket 307 provides data control (e.g., sends dec signals and/or receives pend signals) for a first buffer responsive to a MMR 224 having a first value and provides data control for a second buffer responsive to a MMR 224 having a second value.

As a result, at hardware design time, the hardware task scheduler 300 is configured to receive three inputs from external memory (e.g., via DMA 250) at its consumer sockets 302 and produce six outputs to external memory (e.g., via DMA 250) at its producer sockets 304. However, an additional use case is determined after the hardware design time that additionally includes performing scaling on the Y12 data output. Scheduling software executing on the GPP 102 thus configures the MMR 224 to cause data control for the Y12 buffer/output to be provided on the spare socket 306, which is provided to a multi-scaler or resizing accelerator (the scheduler of which is MSC-SCH) to perform scaling on the Y12 data output in addition to producing the six original data outputs to DMA 250. Accordingly, in an example in which one consumer (e.g., DMA) consumes the Y12 data in less time than another consumer (e.g., MSC-SCH), the HWA scheduler 300 may not overwrite the buffer until a dec signal is received at both the Y12 producer socket and the spare producer socket 306. Thus, the spare producer socket 306 enables additional, programmable connectivity for the hardware task scheduler 300 to handle various use cases not contemplated at the time of hardware design. In other examples, the spare consumer socket 307 similarly enables additional, programmable connectivity for the hardware task scheduler 300 to handle various use cases not contemplated at the time of hardware design.

As described above, in some examples, the hardware task scheduler 300 is provided with multiple spare producer sockets 306, each of which is configurable by the MMR 224 to provide data control for a buffer that is also provided by another producer socket. For example, scheduling software executing on the GPP 102 configures the MMRs 224 to cause the data control for the Y12 buffer/output to be provided on a first spare socket 306, which is provided to the MSC-SCH. The scheduling software also configures the MMRs 224 to cause the data control for the Y12 buffer/output, or another buffer/output, to be provided on a second spare socket, which is provided to another consumer task. The multiple spare producer sockets 306 thus enable further programmable connectivity for the hardware task scheduler 300 to handle various use cases not contemplated at the time of hardware design.

In some examples, the configuration of the spare producer socket 306 is modified by the scheduling software during operation of the SOC 100. For example, the scheduling software configures the MMR 224 to be a first value during a first time period (e.g., to cause the data control for the Y12 buffer/output to be provided on the spare socket 306) and then updates the MMR 224 to be a second value during a second time period. As a result, the spare socket 306 transitions from providing data control for the Y12 buffer/output during the first period to providing data control for another buffer/output (e.g., UV12) during the second time period.

Figure 4:
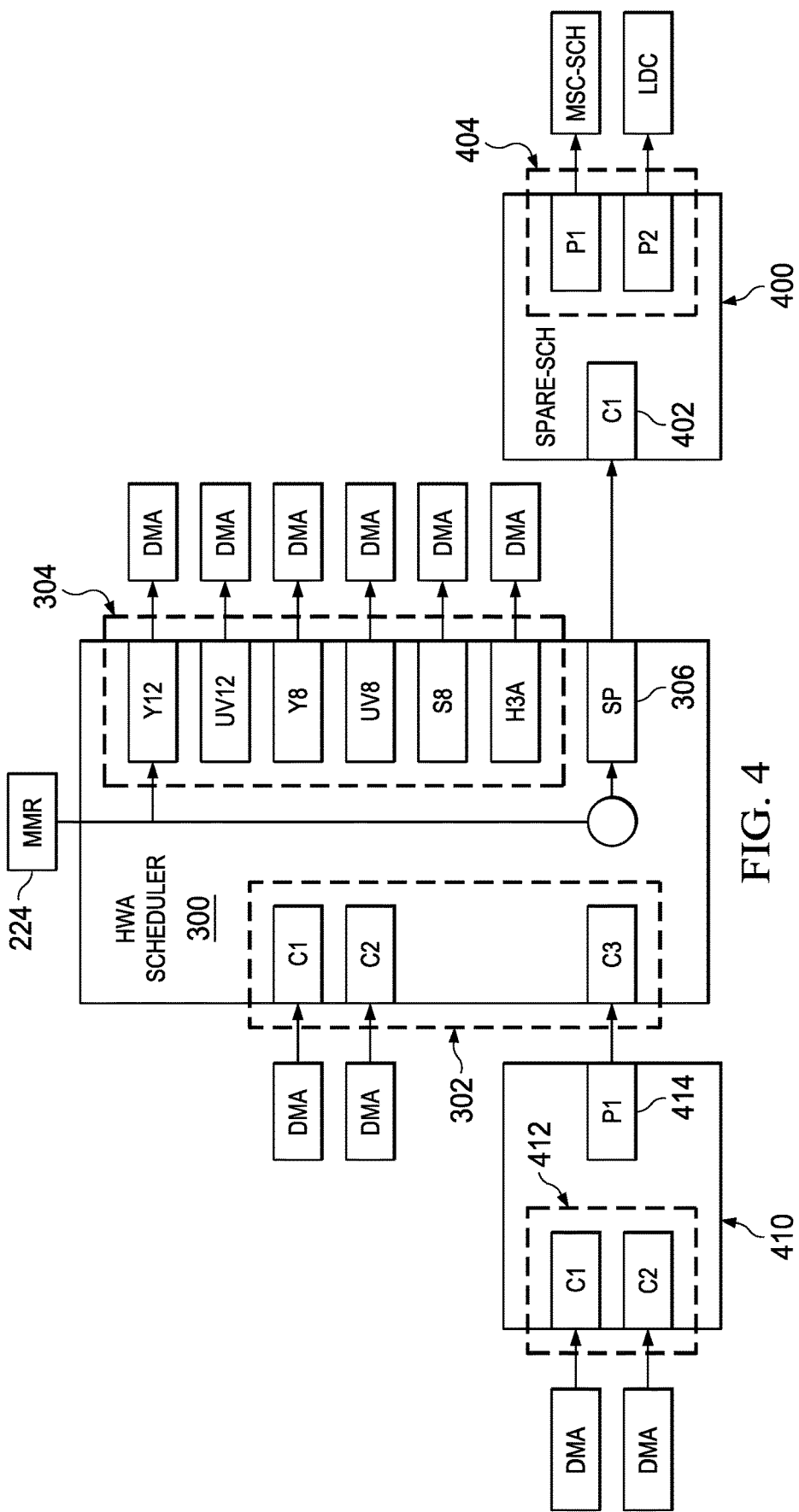
FIG. 4 is a block diagram of a hardware task scheduler coupled to a spare scheduler in accordance with examples of this description.

FIG. 4 is a block diagram of the hardware task scheduler 300 of FIG. 3 coupled to a spare scheduler 400, which is similar to the spare scheduler 226 described above, in accordance with examples of this description. As described above, the spare scheduler 400 is not directly coupled to a hardware processing node, such as a hardware accelerator. The spare scheduler 400 has a consumer socket 402 and a plurality of producer sockets 404. Although not shown in FIG. 4, the spare scheduler 400 may also include configurable spare sockets, such as those described above. The spare scheduler 400 is configured to provide data control through its consumer socket 402 to its plurality of producer sockets 404 (e.g., sending pend signals), and from its producer sockets 404 to its consumer socket 402 (e.g., received dec signals). In this example, the spare scheduler 400 includes two producer sockets 404, although in other examples the spare scheduler 400 includes more than two producer sockets 404. Additionally, although the spare scheduler 400 is shown as having a single consumer socket 402, and thus implements a one-to-many expansion scheme, in other examples, the spare scheduler 400 includes more than one consumer socket 402 and implements a combination of one-to-many expansion schemes (e.g., two consumer sockets 402 and four producer sockets 404 to implement first and second one-to-two expansion schemes).

In another example, another spare scheduler 410 is also not directly coupled to a hardware processing node, such as a hardware accelerator. The spare scheduler 410 has a plurality of consumer sockets 412 and a producer socket 414. Although not shown in FIG. 4, the spare scheduler 410 may also include configurable spare sockets, such as those described above. The spare scheduler 410 is configured to provide data control through its consumer sockets 412 to its producer socket 414 (e.g., receiving pend signals), and from its producer socket 414 to its consumer socket 404 (e.g., sending dec signals).

As described with respect to FIG. 3, the spare socket 306 of the hardware task scheduler 300 is configured (e.g., via a MMR 224 value) to provide data control for the Y12 buffer/output through the spare producer socket 306. In the example of FIG. 4, an additional use case is determined after the hardware design time that includes providing the data control from the spare socket 306 to more than one consuming node. For example, in addition to providing the Y12 data output to the multi-scaler or resizing accelerator (MSC-SCH), the additional use case includes using a lens distortion correction (LDC) accelerator (or another accelerator not specifically enumerated) to perform lens distortion correction on the Y12 data.

Scheduling software executing on the GPP 102 thus configures the MMR 224 to cause the data control for the Y12 buffer/output to be provided on the spare producer socket 306. Additionally, the consumer socket 402 of the spare scheduler 400 is configured to receive data control signals (e.g., pend signal) produced at the spare socket 306. The producer sockets 404 of the spare scheduler 400 are configured to duplicate the data control signals received at the consumer socket 402. One of the producer sockets 404 provides the signals (and thus the Y12 data connection) to the MSC-SCH while the other of the producer sockets 404 provides the signals (and thus the Y12 data connection) to the LDC. Thus, as above, the spare producer socket 306 enables additional, programmable connectivity for the hardware task scheduler 300 to handle various use cases not contemplated at the time of hardware design. Further, in some examples, the spare scheduler 400 enables additional providing of, or duplication of, data received at its consumer socket 402 to its producer sockets 404. In terms of hardware design, it may be less costly (e.g., reduced scheduler area, reduced crossbar 222 routing complexity) to implement the spare scheduler 400 to duplicate data produced at a producer socket of a hardware task scheduler 300 when compared to implementing additional producer sockets in the hardware task scheduler 300 itself.

Figure 5:
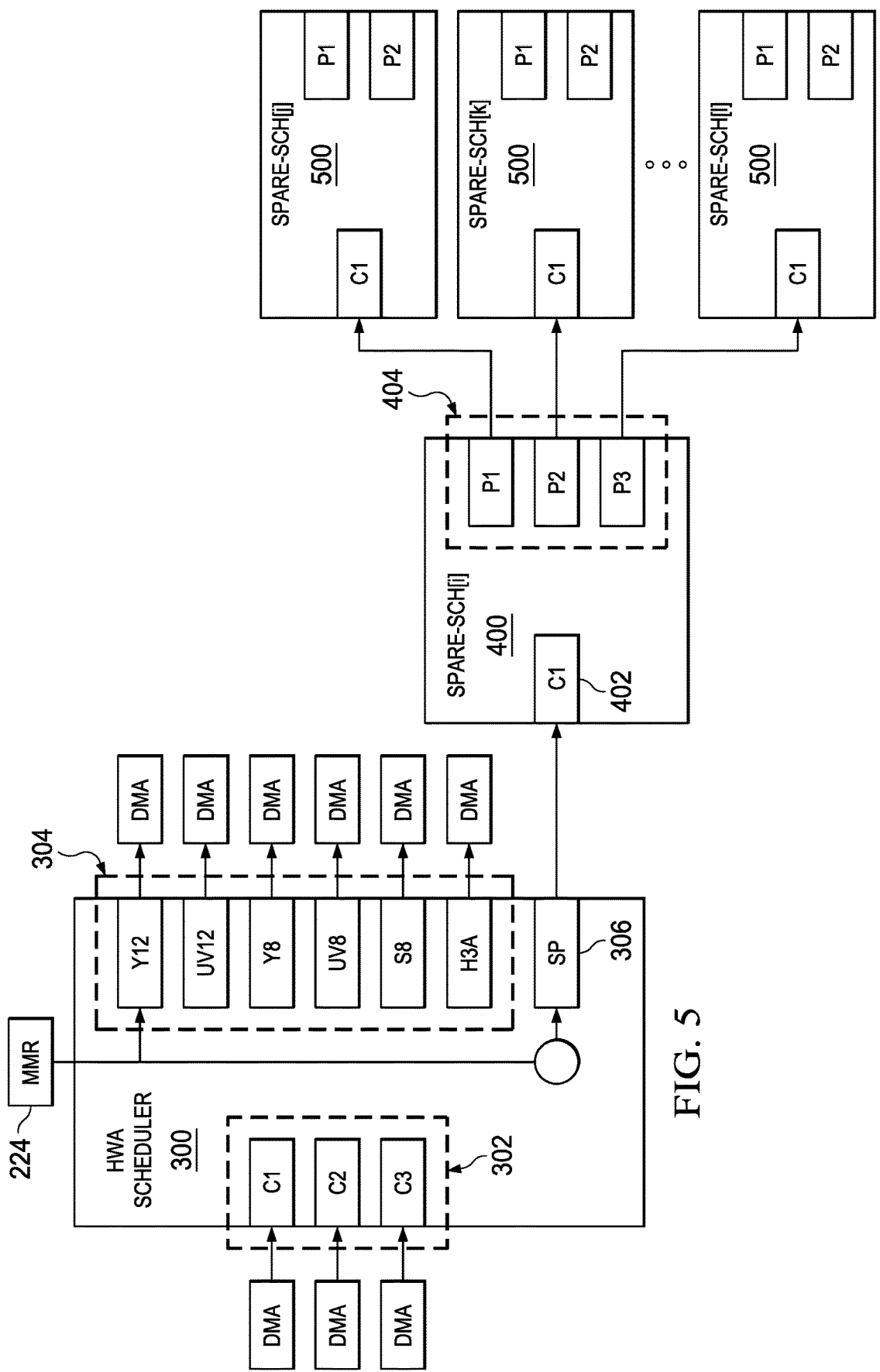
FIG. 5 is a block diagram of a hardware task scheduler coupled to a chain of spare schedulers in accordance with examples of this description.

FIG. 5 is a block diagram of the hardware task scheduler 300 of FIG. 3 coupled to a first-level spare scheduler 400, which is chained to additional second-level spare scheduler(s) 500 in accordance with examples of this description. Similar to the spare scheduler 400, the spare scheduler(s) 500 are not coupled to a hardware processing node, such as a hardware accelerator. The spare schedulers 500 also include a consumer socket and a plurality of producer sockets, and function similarly to the spare scheduler 400 as described above. In this example, the spare scheduler 400 includes three producer sockets 404, although in other examples the spare scheduler 400 includes different numbers of producer sockets 404.

In the example of FIG. 5, spare schedulers 400, 500 are chained together to facilitate production of an arbitrary data flow graph. For example, scheduling software executing on the GPP 102 configures the MMR 224 to specify the desired coupling between the hardware task scheduler 300 producer socket 304 or spare sockets 306, 307 and the first-level spare scheduler 400. The scheduling software also configures the MMR 224 to specify the desired coupling between the first-level spare scheduler 400 producer sockets 404 and the second-level spare schedulers 500. In some examples, the second-level spare schedulers 500 produce data to be consumed by a hardware node. In another example, the second-level spare schedulers 500 provide an indication of data availability for distribution (e.g., by providing pend/dec signals as explained above), such as to another hardware accelerator. In other examples, the second-level spare schedulers 500 produce data to additional level(s) of spare schedulers to further duplicate the data or indications of data availability (e.g., by providing pend/dec signals).

In these examples, an arbitrary data flow graph is configurable by the scheduling software to address use cases determined after the time of hardware design. Additionally, in terms of hardware design, it may be less costly to implement the chain of spare schedulers 400, 500 to duplicate or expand data control or indications of data availability produced at a producer socket of a hardware task scheduler 300 when compared to implementing additional producer sockets in the hardware task scheduler 300 itself.

In some examples, the configuration of the spare schedulers 400, 500 is modified by the scheduling software during operation of the SOC 100. For example, the scheduling software configures the MMR 224 to specify a first desired coupling between the hardware task scheduler 300 producer socket 304 or spare socket 306 and the first-level spare scheduler 400 (and/or between the first-level spare scheduler 400 producer sockets 404 and the second-level spare schedulers 500) during a first time period. The scheduling software then updates the MMR 224 to specify a second desired coupling between the hardware task scheduler 300 producer socket 304 or spare socket 306 and the first-level spare scheduler 400 (and/or between the first-level spare scheduler 400 producer sockets 404 and the second-level spare schedulers 500) during a second time period. As a result, coupling(s) between the hardware task scheduler 300, the first-level spare scheduler 400, and the second-level spare scheduler 500 are updated from the first time period to the second time period.

Figure 6:
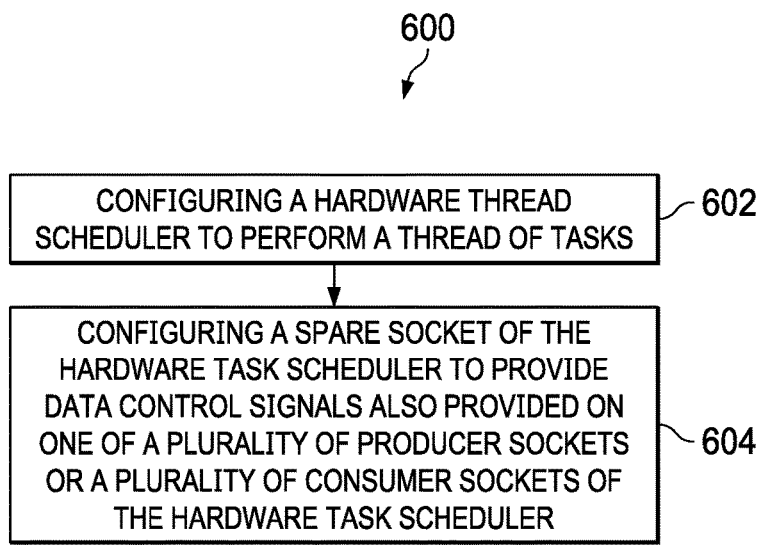
FIG. 6 is a flow chart of a method for configuring a hardware accelerator in accordance with examples of this description.

FIG. 6 is a flow chart of a method 600 of configuring a spare socket (e.g., spare socket 306, described above) and a spare scheduler (e.g., spare scheduler 400, 500, described above) in accordance with examples of this description. In some examples, the method 600 includes steps that are carried out by scheduling software, such as that described above and executed by the GPP 102.

The method 600 begins in block 602 with configuring a hardware thread scheduler to perform a thread of tasks. In particular, the hardware thread scheduler includes a hardware task scheduler coupled to a hardware data processing node, as described above. The hardware data processing node is configured to execute one of the tasks of the thread.

The method continues in block 604 with configuring a spare socket of the hardware task scheduler to provide data control signals (e.g., pend and dec signals) also provided on one of a plurality of producer sockets or a plurality of consumer sockets of the hardware task scheduler. For example, the spare socket is a spare producer socket that, responsive to a MMR 224 having a first value, provides data control signals that are also provided by a first producer socket of the hardware task scheduler. Continuing this example, the spare producer socket provides data control signals that are also provided by a second producer socket of the hardware task scheduler responsive to the MMR 224 having a second value. Thus, the spare socket enables additional, programmable connectivity for the hardware task scheduler, such as to handle an after-developed use case graph, or a use case that was not contemplated at the time of hardware design. For example, the hardware task scheduler is configured to produce data to an additional consumer task, which would not have been possible using the originally-designed set of producer sockets.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitor, respectively, coupled in parallel between the same nodes. For example, a resistor or capacitor shown and described herein as a single component may instead be multiple resistors or capacitor, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. A device, comprising:
    a hardware data processing node configured to execute a respective task; and
    a hardware thread scheduler comprising a hardware task scheduler, the hardware task scheduler coupled to the hardware data processing node and having a producer socket, a consumer socket, and a spare socket;
    wherein the spare socket is configured to provide data control signals also provided by the producer socket responsive to a memory-mapped register being a first value; and
    wherein the spare socket is configured to provide data control signals also provided by the consumer socket responsive to the memory-mapped register being a second value.

2. The device of claim 1, wherein:
    the producer socket is one of a plurality of producer sockets and the spare socket is a spare producer socket;
    the spare producer socket is configured to provide data control signals also provided by a first producer socket of the plurality of producer sockets responsive to the memory-mapped register being a first value; and
    the spare producer socket is configured to provide data control signals also provided by a second producer socket of the plurality of producer sockets responsive to the memory-mapped register being a second value.

3. The device of claim 2, wherein:
    the memory-mapped register is a first memory-mapped register and the hardware task scheduler is a first hardware task scheduler;
    the consumer socket is one of a plurality of consumer sockets and the first hardware task scheduler includes a spare consumer socket;
    the spare consumer socket is configured to provide data control signals to and receive data control signals from a producer socket of a second hardware task scheduler responsive to a second memory-mapped register being a third value; and
    the spare consumer socket is configured to provide data control signals to and receive data control signals from a producer socket of a third hardware task scheduler responsive to the second memory-mapped register being a fourth value.

4. The device of claim 2, wherein:
the spare producer socket is a first spare producer socket and the memory-mapped register is a first memory-mapped register;
the hardware task scheduler includes a second spare producer socket;
the second spare producer socket is configured to provide data control signals also provided on the first producer socket responsive to a second memory-mapped register being a third value; and
the second spare producer socket is configured to provide data control signals also provided on the second producer socket responsive to the second memory-mapped register being a fourth value.

5. The device of claim 2, wherein the spare socket is configured to transition from duplicating data provided on the first producer socket to duplicating data provided on the second producer socket responsive to the memory-mapped register being updated from the first value to the second value.

6. The device of claim 2, further including a spare scheduler having:
a consumer socket coupled to one of the plurality of producer sockets of the hardware task scheduler; and
a plurality of producer sockets configured to provide data duplicated from the consumer socket.

7. The device of claim 6, wherein the consumer socket of the spare scheduler is coupled to the spare producer socket.

8. A device, comprising:
a hardware data processing node configured to execute a respective task;
a hardware thread scheduler comprising a hardware task scheduler, the hardware task scheduler coupled to the hardware data processing node and having a plurality of producer sockets; and
a spare scheduler having:
a consumer socket coupled to one of the plurality of producer sockets of the hardware task scheduler; and
a plurality of producer sockets configured to provide data control signals from the consumer socket.

9. The device of claim 8, wherein the spare scheduler is not directly coupled to a hardware data processing node.

10. The device of claim 8, wherein the spare scheduler is a first-level spare scheduler and the device further includes:
a second-level spare scheduler having:
a consumer socket coupled to one of the plurality of producer sockets of the first-level spare scheduler; and
a plurality of producer sockets configured to provide data control signals from the consumer socket.

11. The device of claim 10, wherein one or more memory-mapped registers are configured to specify:
a first coupling between the consumer socket of the first-level spare scheduler and the one of the plurality of producer sockets of the hardware task scheduler; and
a second coupling between the consumer socket of the second-level spare scheduler and the one of the plurality of producer sockets of the first-level spare scheduler.

12. The device of claim 11, wherein one of the couplings is updated from a first time period to a second time period responsive to an update to the one or more memory-mapped registers between the first and second time periods.

13. The device of claim 8, wherein:
the hardware task scheduler includes a spare producer socket;
the spare producer socket is configured to provide data control signals also provided on a first producer socket of the plurality of producer sockets responsive to a memory-mapped register being a first value; and
the spare producer socket is configured to provide data control signals also provided on a second producer socket of the plurality of producer sockets responsive to the memory-mapped register being a second value.

14. The device of claim 13, wherein:
the memory-mapped register is a first memory-mapped register and the hardware task scheduler is a first hardware task scheduler;
the first hardware task scheduler includes a plurality of consumer sockets and a spare consumer socket;
the spare consumer socket is configured to receive data control signals from a producer socket of a second hardware task scheduler responsive to a second memory-mapped register being a third value; and
the spare consumer socket is configured to receive data control signals from a producer socket of a third hardware task scheduler responsive to the second memory-mapped register being a fourth value.

15. A method, comprising:
configuring, by scheduling software executing on a processor, a hardware thread scheduler to perform a thread of tasks, wherein the hardware thread scheduler includes a hardware task scheduler coupled to a hardware data processing node configured to execute a task of the thread;
configuring, by the scheduling software, a spare socket of the hardware task scheduler to provide data control signals also provided on one of a plurality of producer sockets or a plurality of consumer sockets of the hardware task scheduler by writing a value to a memory-mapped register;
providing data control signals also provided on a first producer socket of the plurality of producer sockets to the spare socket responsive to the memory-mapped register being a first value; and
providing data control signals also provided on a second producer socket of the plurality of producer sockets to the spare socket responsive to the memory-mapped register being a second value.

16. The method of claim 15, further comprising:
writing, by the scheduling software, the first value to the memory-mapped register; and
subsequently writing, by the scheduling software, the second value to the memory-mapped register;
wherein the spare socket transitions from providing data control signals also provided on the first producer socket to providing data control signals also provided on the second producer socket responsive to the memory-mapped register being updated from the first value to the second value.

17. The method of claim 15, wherein the spare socket is a first spare socket, the method further comprising configuring, by the scheduling software, a second spare socket of the hardware task scheduler to provide data control signals also provided on another one of the plurality of producer sockets or the plurality of consumer sockets of the hardware task scheduler.

18. The method of claim 15, further comprising configuring, by the scheduling software, a spare scheduler consumer socket to be coupled to one of the plurality of producer sockets of the hardware task scheduler, wherein the spare scheduler includes a plurality of producer sockets configured to provide data control signals from the spare scheduler consumer socket, and wherein the spare scheduler is not directly coupled to a hardware data processing node.

19. The method of claim 15, wherein the hardware task scheduler is a first hardware task scheduler including a plurality of consumer sockets and a spare consumer socket, the method further comprising:
- configuring, by the scheduling software, the spare consumer socket by writing a value to a memory-mapped register;
- responsive to the memory-mapped register being a first value, receiving data control signals at the spare consumer socket from a producer socket of a second hardware task scheduler; and
- responsive to the memory-mapped register being a second value, receiving data control signals at the spare consumer socket from a producer socket of a third hardware task scheduler.

\* \* \* \* \*